Jan. 16, 1968  M. E. KIRKPATRICK  3,363,306
BRAZING METHODS FOR POROUS REFRACTORY METALS
Filed Sept. 18, 1964
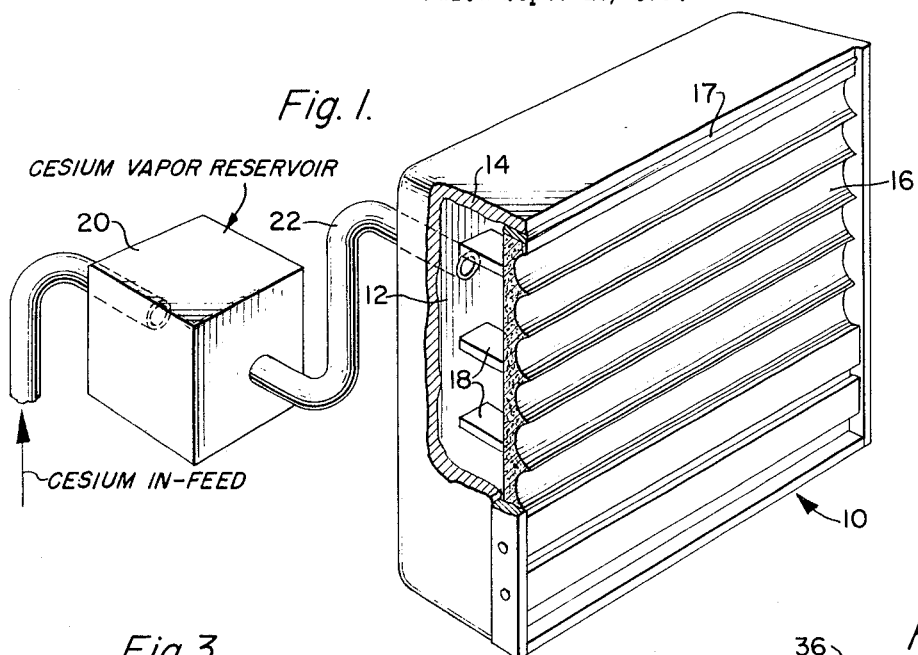
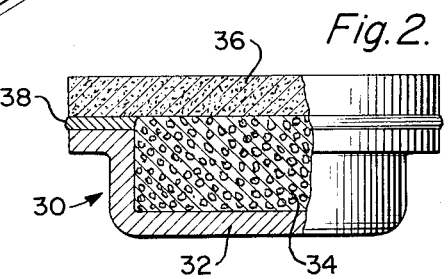
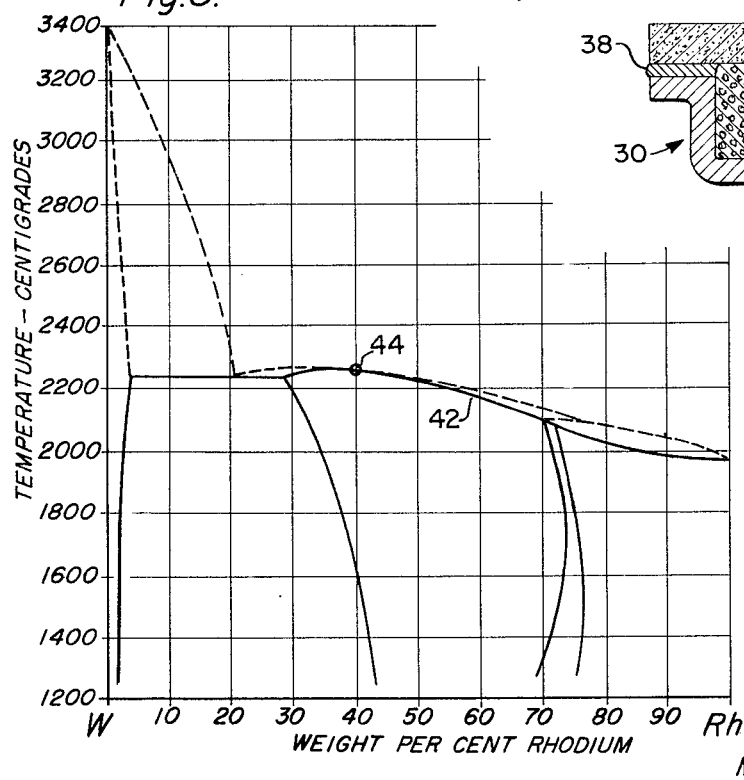
INVENTOR:
MILTON E. KIRKPATRICK,
BY
ATTORNEY.

United States Patent Office 3,363,306
Patented Jan. 16, 1968

3,363,306
BRAZING METHODS FOR POROUS
REFRACTORY METALS
Milton E. Kirkpatrick, Palos Verdes Estates, Calif., assignor to TRW Inc., a corporation of Ohio
Filed Sept. 18, 1964, Ser. No. 397,581
6 Claims. (Cl. 29—487)

ABSTRACT OF THE DISCLOSURE

This invention relates to a method of bonding or brazing porous tungsten to other high melting temperature metals such as molybdenum or tungsten by applying a rhodium interface between the metals to be bonded, heating the metals to melt the rhodium, and heat-treating the metals at slightly reduced temperatures to promote diffusion of the rhodium.

---

The invention herein described was made in the course of or under a contract or subcontract thereunder, with the United States Air Force.

As used hereinafter, the term "porous tungsten" is intended to refer to the material sometimes called partially sintered tungsten usually having a porosity of approximately 20% of the total volume, such porosity comprising minute channels communicating through the material and through which emissive materials may be caused to flow. Porous tungsten of the type which the present invention may employ is now well known in the art and is widely used for the manufacture of certain types of vacuum tubes and in electrostatic propulsion ion engines. One type of porous tungsten is described, for example, in U.S. Patent No. 2,464,517 issued Mar. 15, 1949. Another type of porous tungsten and a method of making the same is described in my copending patent application Ser. No. 317,005 filed Oct. 17, 1963.

In the vacuum tube manufacturing industry, it is often necessary to form cathode structures by joining porous tungsten to base members or support members formed of fully dense tungsten or molybdenum. The bond between such parts must withstand very high temperatures and be free from contamination as well as meeting several other requirements. For example, in the manufacture of dispenser type cathodes, an emissive surface member of porous tungsten is commonly joined to a cup shaped molybdenum member adapted to contain a quantity of an emissive material such as thorium oxide ($ThO_2$). In operation, the thorium oxide is caused to "boil out" through pores in the tungsten member to form a highly emissive monatomic layer on the external surface of the tungsten. In operation of certain vacuum tubes, cathode operating temperatures of the order of 2000 to 2200° C. are utilized.

Another application of the present invention is found in the manufacture of ion emitter structures for use in electrostatic propulsion engines of the contact ionization type. In such engines, it is necessary and usual to provide a plenum chamber formed primarily of a fully dense refractory metal such as tungsten or molybdenum to which is hermetically sealed a transpirative member formed of porous tungsten. Propellant material such as cesium vapor is continuously supplied to the plenum chamber and is caused to diffuse or transpire through the pores of the porous tungsten in a manner such that substantially all the cesium atoms are ionized by contact with the external surface of the porous tungsten. In the manufacture of ion emitter structures for such ion engines, one of the most difficult problems has been that of reliably joining porous tungsten members to fully dense tungsten or molybdenum plenum chambers. One requirement of such assemblies is that the joint must provide a leak-proof hermetic seal so that non-ionized cesium vapor is not wasted by leakage from the system. An additional requirement is that the assembly must retain substantial mechanical strength when elevated to temperatures approaches 2000° C. Additionally, the joint or braze region must be formed of a material which (1) will not react with or be eroded by highly active materials such as cesium vapor, and (2) will not contaminate the cesium vapor or otherwise decrease the ion emission work function of the porous refractory metal emitter member.

In addition to simultaneously meeting all the foregoing criteria, the bonding or brazing material must have an initial melting temperature substantially below the temperatures at which deterioration of porous tungsten may tend to occur. That is, at temperatures of the order of 2200 to 2500° C. sintered porous tungsten begins to suffer from additional sintering which results in a deleterious closure of the fine pores accompanied by reduction in the transpiration rate at which cesium vapor flows through the porous tungsten. The brazing material must be capable of wetting the porous tungsten at temperatures below that range so that a high reliability braze can be achieved without risking deterioration of the emitter porosity.

Accordingly, a primary object of this invention is to provide a method of bonding porous tungsten or molybdenum to other refractory metals which method produces a vacuum-tight hermetic seal, avoids the use of materials which will deteriorate the transpirative character of the tungsten and which forms a bond having reliable mechanical strength at high operating chambers.

It is an additional object of the invention to provide a method of bonding porous tungsten which meets the above mentioned requirements and additionally is immune to erosion by or reaction with alkali metal vapor and the like.

It is a further object of the present invention to provide an improved emitting electrode for electric discharge devices which is capable of operating at temperatures exceeding the temperature levels used in assembling the structure.

All the above mentioned objects and requirements are well satisfied by this invention. However, the foregoing consideration of the problems associated with specific applications of the invention are not to be considered in any way limiting. Rather, in its broader aspects, the invention is generally applicable to the bonding of porous tungsten to other members formed of tungsten or molydenum. Within the scope of the invention such other members may be porous or non-porous and may take substantially any shape required by the ultimate application.

Briefly, in the practice of this invention, a porous tungsten member is bonded to a fully dense tungsten or molybdenum member by heating the members to be bonded, while assembled with a quantity of rhodium or rhodium-molybdenum alloy bonding material contacting the juxtaposed areas which are to be bonded together. The assembled members are heated to a temperature of about 2000° C. at which temperature the bonding material is transformed to the liquid phase and wets the juxtaposed surfaces. The rhodium-rich liquid phase dissolves tungsten from the surfaces of the members to be bonded and forms a tungsten-rhodium alloy or tungsten-rhodium-molybdenum alloy. The temperature is then lowered at a rate of the order of 50° C. per minute to avoid thermal stress in or near the joint interface. While annealing is not critical, it has been found desirable to anneal the assembly for at least a short time for the purpose of causing progressive alloying through thermal diffusion of the bonding material with the tungsten. Specifically, in the case of rhodium-tungsten alloying, the re-melt temperature of the bond zone between the two members is progressively elevated resulting in solidification of the bonding material at temperatures higher than the normal melting temperature of pure rhodium. Thus a final assembly results which subsequently can be elevated to temperatures substantially exceeding the melting temperature of pure rhodium and exceeding the temperatures used in brazing the members together.

The invention will be better appreciated and more fully understood from the following description of specific applications as shown in the accompanying drawings, wherein:

FIGURE 1 is a perspective view partially in cross-section, showing a typical emitter module of an electrostatic propulsion ion engine.

FIGURE 2 is an enlarged cross-sectional view of a dispenser-type cathode in accordance with the invention.

FIGURE 3 is an alloying diagram useful in explaining the invention.

To provide a fuller understanding of one application wherein the present invention has been found advantageous, there is illustrated in FIGURE 1 a single module or section of a typical electrostatic propulsion ion engine. The engine module shown in FIGURE 1 is not, in general, a novel apparatus. One typical engine of the type with respect to which the present invention constitutes an improvement is described in detail in U.S. Patent 3,014,154 issued Dec. 19, 1961 to K. W. Ehlers et al. Another somewhat similar ion propulsion system to which the present invention is applicable is described in detail in copending application, Ser. No. 203,200, filed June 18, 1962, now Patent No. 3,210,926 which is assigned to the same assignee as that of the present invention. For brevity only those parts of the ion engine module 10 which are directly pertinent to this invention are described in the following.

The engine module comprises, essentially, a rectangular plenum chamber 12 which is enclosed by a tungsten member 14 forming the rear and side walls of the chamber. The front wall 16 of the chamber comprises a porous tungsten electrode conforming to the rectangular shape of the side walls and having a porosity as discussed heretofore. The inner surface of the porous tungsten member 16 is substantially planar and spaced apart from the inner surface of member 14 by a plurality of short pedestals 18 which are secured to and extend outwardly from the member 14. The exterior surface of the porous tungsten member 16 is fluted or longitudinally grooved for reasons which are discussed in full in the above mentioned copending application and which are not relevant to the present invention. In accordance with usual ion engine practice, the emitter module 10 is heated, in normal operation, to temperatures of the order of 1200 to 1600° C. by appropriate electrical heaters (not shown) and an alkali vapor propellant such as cesium is continuously fed to the plenum chamber 12 from a vapor reservoir 20 by way of a propellant feed conduit 22.

Such ion propulsion engines are intended for long term deep space missions and therefore operate in a vacuum environment. Accordingly, even though the cesium vapor propellant is supplied to the plenum chamber 12 at an absolute pressure substantially below atmospheric pressure, there is a positive interior-to-exterior pressure applied to the porous tungsten member 16. For that reason, inter alia, it is necessary to mechanically secure the porous tungsten member 16 to the member 14. Additionally, to avoid leakage of un-ionized propellant vapor from the system, it is essential that the member 16 be hermetically sealed along its edges to the side wall portions of the member 14. The present invention relates particularly to the method of hermetically bonding the member 16 to the member 14.

The member 14 is usually and preferably formed of a refractory metal such as fully dense tungsten or molybdenum so that it is gas and vapor impervious. In accordance with one embodiment of the present invention, a strip of high purity rhodium foil is placed between the surfaces to be joined. The members 14 and 16 are then clamped in the assembled position and heated in vacuum or in a reducing atmosphere to a temperature of the order of 1900 to 2000° C. A few minutes at that temperature is sufficient to melt the interstitial rhodium layer so that it wets the juxtaposed surfaces of the members 14 and 16 and produces a bond region 17 therebetween. Where member 14 is formed of fully dense tungsten, the rhodium immediately begins to dissolve the surfaces of both members, forming a tungsten-rhodium liquid solution. As the tungsten content of the liquid solution increases, the melting temperature increases so that the braze material can and will solidify even before the furnace temperature is lowered.

After a few minutes at the temperature required to melt the original rhodium foil, the furnace temperature is slowly lowered, at a rate preferably of the order of, or less than, 50° C. per minute, to avoid formation of thermal stresses in the braze region. The resulting tungsten-rhodium alloy firmly bonds the two members 14 and 16 together and progressively increases the melting temperature of the bond zone 17 so that the assembly may later be operated or processed at temperatures exceeding the melting temperature of pure rhodium. Thus the composite assembly may be safely subjected to temperatures exceeding 2000° C. without remelting the bond zone. This is particularly advantageous, for example, in situations where it may be desirable to occasionally de-gas the emitter assembly by heating it in vacuo to temperature levels exceeding the normal operating temperatures. After the above described brazing procedure the composite assembly is removed from the brazing furnace and is assembled with the other elements of the system shown in FIGURE 1 for use with a plurality of similar engine modules in an electrostatic propulsion space vehicle.

The particular feature of the present invention just discussed is also advantageous in the manufacture of electron discharge devices. Specifically, the invention makes it possible to process such devices at temperatures higher than the temperatures used in brazing the porous tungsten element to the members which support it. FIGURE 2 illustrates application of the invention in the manufacture of cathode structures for electron tubes. FIGURE 2 shows a typical planar cathode assembly of the invention. The cathode 30 comprises essentially a hat-shaped receptacle 32 which is filled with an emissive material 34 such as $ThO_2$ and is closed across the top by a planar disc 36 of sintered or porous tungsten. As is well known in the art, upon being heated this type of cathode dispenses $ThO_2$ out through the pores of the tungsten member 36. A monatomic layer of $ThO_2$ is formed on the external surface of the porous tungsten disc and is continuously replenished from the supply which is contained within the receptacle 32. In such electron tubes, it is necessary that the members 32 and 36 be joined together in a manner such that the cathode assembly can be elevated to temperatures of the order of 2000° C. during the subsequent manufacturing steps involved in incorporating the cathode assembly into a complete electron tube. Further, at least in some specific cases, it is desirable to be able to operate the complete electron tubes at approximately 2200° C. without encountering structural difficulty.

In accordance with the invention, either rhodium foil or rhodium-molybdenum alloy is used to form a braze region 38 between members 32 and 36. The use of rhodium alloy as a bonding material has another outstanding advantage both in the manufacture of ion engines and in the manufacture of vacuum tubes. Specifically, when rhodium alloy is bonded to the porous tungsten it does not infiltrate the pores of the tungsten member so as to plug the pores or deteriorate the transpirative character of the tungsten. Rather, when the bonding materials of the present invention start to penetrate a pore in the tungsten, they very quickly react with the tungsten walls of the pore and become rich in tungsten. As shown by curve 42 in FIGURE 3, as the rhodium is enriched with tungsten, the temperature at which it can remain in the liquid phase rapidly increases. That is, for example, an isolated droplet of rhodium as it approaches the porous tungsten has a melting temperature of about 1960° C. When it becomes enriched with tungsten to about the 60% rhodium ratio, it has a minimum melting temperature of about 2160° C. and when it is further enriched so that it is less than 40% rhodium (as indicated by point 44 in FIGURE 3) the melting temperature has risen to above 2200° C. This simply means that if a microscopic droplet of rhodium enters a pore in the tungsten member 36, it is quickly enriched with tungsten and "freezes" before it can penetrate far enough into the porous tungsten to seriously decrease the porosity.

Additionally, the use of rhodium for brazing porous tungsten has the advantages that it does not deteriorate the contact ionization potential of the porous tungsten, it does not react with cesium or other alkali vapors commonly used in ionic propulsion systems and it has an initial melting temperature which is well below the range at which additional sintering deterioration of porous tungsten occurs. The following specific example further illustrates, in particular detail, the preferred brazing method of the invention as it is used in the assembly of ion emitter modules of the type illustrated in FIGURE 1.

Firstly, the porous tungsten emitter member 16 and the second member 14 are cleaned and de-gased by heating in a hydrogen-environment furnace.

Secondly, a strip of chemically pure rhodium foil between 1 and 2 mils thick is positioned between the interface surfaces which are to be united and the assembly is clamped together.

Thirdly, the assembly is heated in a high temperature vacuum furnace to a temperature between 1900 and 2000° C. for a time sufficient for all the components to reach temperature equilibrium. The time at maximum temperature need only be long enough to assure complete liquidation, surface wetting and flow of the rhodium over the surfaces to be joined. Ordinarily a time of the order of a few minutes is adequate. While the time (at maximum temperature) is not highly critical, some additional sintering of the porous tungsten can occur at temperatures as low as 1700–1800° C. It is therefore desirable to avoid unnecessary long annealing at the maximum temperature.

Fourthly, the assembled structure is finally incorporated, along with other conventional components into an ion engine system of the type illustrated in FIGURE 1. Because of the elevated remelt temperature of the bond zone which this invention provides, the ion engine may be operated at emitter temperatures in the range of 1200–1700° C. without fear of structural failure.

While the foregoing example has described the use of rhodium foil it will, of course, be appreciated that the invention is not so limited but that various other techniques of applying either pure rhodium or rhodium, molybdenum alloy to the surface to be brazed may be used.

For example, a satisfactory method of preparing a braze joint of molybdenum-rhodium alloy is as follows:

A mechanical mixture of powdered rhodium and powdered molybdenum is prepared having a composition of 40 weight percent rhodium and 60 weight percent molybdenum. The alloy powder is applied in a thin layer a few mils thick to one or both of the surfaces to be joined. Conveniently, this may be done either by painting on an alcohol slurry of the mixture, or by dusting the powder mixture on the component surfaces after the same have been coated with a thermally dispersable adhesive. The components are then clamped together and heated to 2000° C. in vacuum until the complete formation of a liquid phase alloy. This procedure forms a molybdenum-rhodium eutectic composition (40 wt./o Rh-60 wt./o Mo) in the braze region. That alloy then dissolves tungsten or molybdenum or both from the juxtaposed surfaces to form a tungsten and/or molybdenum enriched bond zone having a remelt temperature higher than the original melting temperature of the molybdenum-rhodium eutectic.

While this invention has been described with reference to certain specific embodiments, it will be apparent to those skilled in the art that it is not so limited but is susceptible of various changes and modifications without departing from the spirit and scope thereof.

The embodiment of the invention in which an exclusive property or privilege is claimed are defined as follows:

1. In a process of bonding a first member consisting essentially of porous tungsten to a second member consisting essentially of a metal selected from the group which consists of molybdenum and tungsten, the procedure comprising the steps of:

applying a relatively thin layer of substantially pure rhodium to at least a portion of one of said members;

holding said members together in a manner such that said rhodium is disposed between the interface areas which are to be united;

heating at least said interface areas to a temperature of about 2000° C. for a time sufficient for said rhodium to be transformed to the liquid phase so that said interface areas are wetted;

and thereafter cooling the assembly at a rate of the order of 50° C. per minute to permit formation of a rhodium-tungsten alloy bond zone having a remelt temperature substantially exceeding 2000° C.

2. In a method of making an electrically charged particle emitting structure of the type in which a porous diffusion member is joined to a relatively nonporous receptacle member to form a dispensing chamber therebetween for containing a low work function material, and in which each of said members comprises primarily a metal selected from the group which consists of tungsten and molybdenum, the procedure comprising the steps of:

applying a thin layer of rhodium containing bonding material to at least one surface of one of said members;

holding said members together with said bonding material between the interface areas which are to be joined;

heating said members to a temperature of the order 2000° C. and at which said bonding material is transformed to the liquid phase to wet said interface areas;

whereby said rhodium containing bonding material alloys with the metal of at least one of said members to form a bond zone between said interface areas which has a remelt temperature in excess of 2000° C.

3. The method in accordance with claim 2 in which said heating steps are conducted in vacuo.

4. The method of joining a porous tungsten first part to a second part consisting primarily of a metal of the group consisting of tungsten and molybdenum, said method including the steps of:

applying a layer of rhodium-rich bonding material to at least one of said parts in a substantial portion of the area to be juxtaposed to the other part;

holding said parts together;

heating at least the juxtaposed portions of said parts to a temperature of about 2000° C. and thereby transforming said bonding material to the liquid phase;

and thereafter annealing the assembly of parts at a temperature in the range of 1600 to 1900° C. to induce progressive alloying of said rhodium with said tungsten whereby the remelt temperature of the bond zone between said parts is elevated to at least about 2000° C.

5. In a process of bonding first and second members together, said first member comprising primarily porous tungsten and said second member consisting essentially of a metal selected from the class which consists of molybdenum and tungsten, the procedure comprising the steps of:

applying a relatively thin layer of brazing material to the area of said first member which is to be bonded to said second member, holding said members together, with said brazing material positioned between the contiguous areas thereof and heating said members to a temperature such that said brazing material is transformed to the liquid phase and wets said contiguous areas;

with said temperature being high enough to induce progressive formation of alloys of said brazing material with the metal of at least one of said members and low enough to prevent said alloys from again passing into the liquid phase;

and with said brazing material being selected from the group which consists of substantially pure rhodium, and a mechanical mixture of rhodium and molybdenum.

6. A process in accordance with claim 5 wherein said brazing material more specifically comprises a mechanical mixture of rhodium powder and molybdenum powder having the composition of about 40 weight percent rhodium and 60 weight percent molybdenum.

References Cited

UNITED STATES PATENTS 3,132,928  5/1964  Crooks et al. _____ 29—198

JOHN F. CAMPBELL, *Primary Examiner.*

L. J. WESTFALL, *Assistant Examiner.*